(12) United States Patent
Chang et al.

(10) Patent No.: US 6,695,894 B2
(45) Date of Patent: Feb. 24, 2004

(54) METHOD AND APPARATUS FOR REMOVING VAPOR PHASE CONTAMINANTS FROM A FLUE GAS STREAM

(75) Inventors: Ramsay Chang, Los Altos, CA (US); Sharon Sjostrom, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 68 days.

(21) Appl. No.: 10/124,000

(22) Filed: Apr. 16, 2002

(65) Prior Publication Data

US 2002/0170431 A1 Nov. 21, 2002

Related U.S. Application Data

(60) Provisional application No. 60/284,588, filed on Apr. 16, 2001.

(51) Int. Cl.$^7$ .......................... B01D 53/04; B01D 46/04
(52) U.S. Cl. ........................ 95/134; 95/148; 95/280; 95/282; 96/146; 96/154; 110/345
(58) Field of Search .................. 95/107, 113, 114, 95/134, 148, 278, 279, 280, 282; 96/108, 143, 144, 145, 146, 150, 154; 110/345

(56) References Cited

U.S. PATENT DOCUMENTS

| | | | |
|---|---|---|---|
| 2,215,323 A | 9/1940 | Guthrie | |
| 3,541,025 A | 11/1970 | Oda et al. | |
| 3,608,273 A | 9/1971 | Fabuss et al. | |
| 3,693,323 A | 9/1972 | Gant | |
| 3,793,806 A | 2/1974 | Fornoff | |
| 3,951,856 A | 4/1976 | Repik et al. | |
| 4,045,368 A | 8/1977 | Katori et al. | |
| 4,134,743 A * | 1/1979 | Macriss et al. | 95/113 |
| 4,415,342 A * | 11/1983 | Foss | 95/107 |
| 4,419,107 A | 12/1983 | Roydhouse | |
| 4,491,609 A | 1/1985 | Degel et al. | |
| 4,500,327 A | 2/1985 | Nishino et al. | |
| 4,617,035 A | 10/1986 | Wakaizumi et al. | |
| 4,690,914 A | 9/1987 | Callut et al. | |
| 4,764,355 A * | 8/1988 | Romey et al. | 423/244.03 |
| 4,883,499 A | 11/1989 | Beierle et al. | |
| 4,889,698 A | 12/1989 | Moller et al. | |
| 4,921,826 A | 5/1990 | Juntgen et al. | |
| 4,921,831 A | 5/1990 | Nakai et al. | |

(List continued on next page.)

FOREIGN PATENT DOCUMENTS

DE    29 32 274 A1    8/1979

OTHER PUBLICATIONS

Chang et al., Pilot Scale Evaluation of Carbon Compound Additives for the Removal of Trace Metals at Coal–Fired Utility Power Plantsl,: *Second International Conference on Managing Hazardous Air Pollutants*, Jul. 1993, pp. VI–41to VI–57.

(List continued on next page.)

*Primary Examiner*—Frank M. Lawrence
(74) *Attorney, Agent, or Firm*—Pennie & Edmonds LLP

(57) ABSTRACT

The present invention provides a method and apparatus for removing trace contaminants from a gas stream or flue gas. In one embodiment, the present invention an apparatus for removing a trace contaminant from a gas stream, comprising a gas duct configured to receive a gas stream comprising a trace contaminant; a plurality of substrates disposed within the gas duct; a trace contaminant sorbent disposed on at least a portion of each of the substrates; an isolation device for separating the portion of each of the substrates from the gas stream; and a regenerator for regenerating the trace contaminant sorbent. In another embodiment, the present invention provides a method for removing a trace contaminant from a gas stream.

21 Claims, 4 Drawing Sheets

U.S. PATENT DOCUMENTS

| | | | |
|---|---|---|---|
| 4,987,115 A | | 1/1991 | Michel-Kim |
| 5,000,007 A | * | 3/1991 | Haefner ...................... 62/55.5 |
| 5,064,805 A | | 11/1991 | Otowa |
| 5,089,030 A | | 2/1992 | Michel-Kim |
| 5,110,480 A | * | 5/1992 | Yan ............................ 210/670 |
| 5,124,292 A | | 6/1992 | Larsen et al. |
| 5,141,724 A | | 8/1992 | Audeh |
| 5,164,355 A | | 11/1992 | Farris et al. |
| 5,187,141 A | | 2/1993 | Jha et al. |
| 5,287,383 A | | 2/1994 | Hirai |
| 5,304,527 A | | 4/1994 | Dimitri |
| 5,306,675 A | | 4/1994 | Wu et al. |
| 5,312,599 A | | 5/1994 | Schwartz, Jr. |
| 5,352,370 A | | 10/1994 | Hayden |
| 5,352,647 A | | 10/1994 | Suchenwirth |
| 5,354,363 A | | 10/1994 | Brown, Jr. et al. |
| 5,364,821 A | | 11/1994 | Holland |
| 5,370,720 A | | 12/1994 | Duncan |
| 5,406,006 A | | 4/1995 | Hill et al. |
| 5,409,522 A | | 4/1995 | Durham et al. |
| 5,419,884 A | | 5/1995 | Weekman et al. |
| 5,438,029 A | | 8/1995 | Kobata et al. |
| 5,444,031 A | | 8/1995 | Hayden |
| 5,505,766 A | | 4/1996 | Chang |
| 5,538,932 A | | 7/1996 | Yan et al. |
| 5,569,436 A | | 10/1996 | Lerner |
| 5,575,982 A | | 11/1996 | Reiss et al. |
| 5,628,819 A | | 5/1997 | Mestemaker et al. |
| 5,672,323 A | | 9/1997 | Bhat et al. |
| 5,733,515 A | | 3/1998 | Doughty et al. |
| 5,827,352 A | | 10/1998 | Altman et al. |
| 5,854,173 A | | 12/1998 | Chang et al. |
| 5,948,143 A | | 9/1999 | Sjostrom et al. |
| 6,103,205 A | | 8/2000 | Wojtowicz et al. |
| 6,136,072 A | | 10/2000 | Sjostrom et al. |
| 6,197,097 B1 | * | 3/2001 | Ertl et al. ...................... 96/143 |
| 6,264,905 B1 | * | 7/2001 | Spokoyny ................... 423/237 |
| 6,517,610 B1 | * | 2/2003 | de la Houssaye ............. 95/107 |

OTHER PUBLICATIONS

"Activated Carbon," *Kirk–Othmer Encyclopedia of Chemical Technology* $4^{th}$. Ed., vol. 4, 1992, pp. 1015–1037.

U.S. patent application Ser. No. 09/259,671 to Chang, et al., filed Mar. 26, 1999, entitled "Apparatus and Method for Removal of Vapor Phase Contaminants from a Gas Stream by In–Situ Activation of Carbon–Based Sorbents".

U.S. patent application Ser. No. 10/052,421 to Chang, et al., filed Jan. 17, 2002, entitled "Method and Apparatus for Renewable Mercury Sorption".

U.S. patent application Ser. No. 09/795,343 to Chang, et al., filed Feb. 27, 2002, entitled "Apparatus and Method for Decreasing Contaminants Present in a Gas Stream".

* cited by examiner

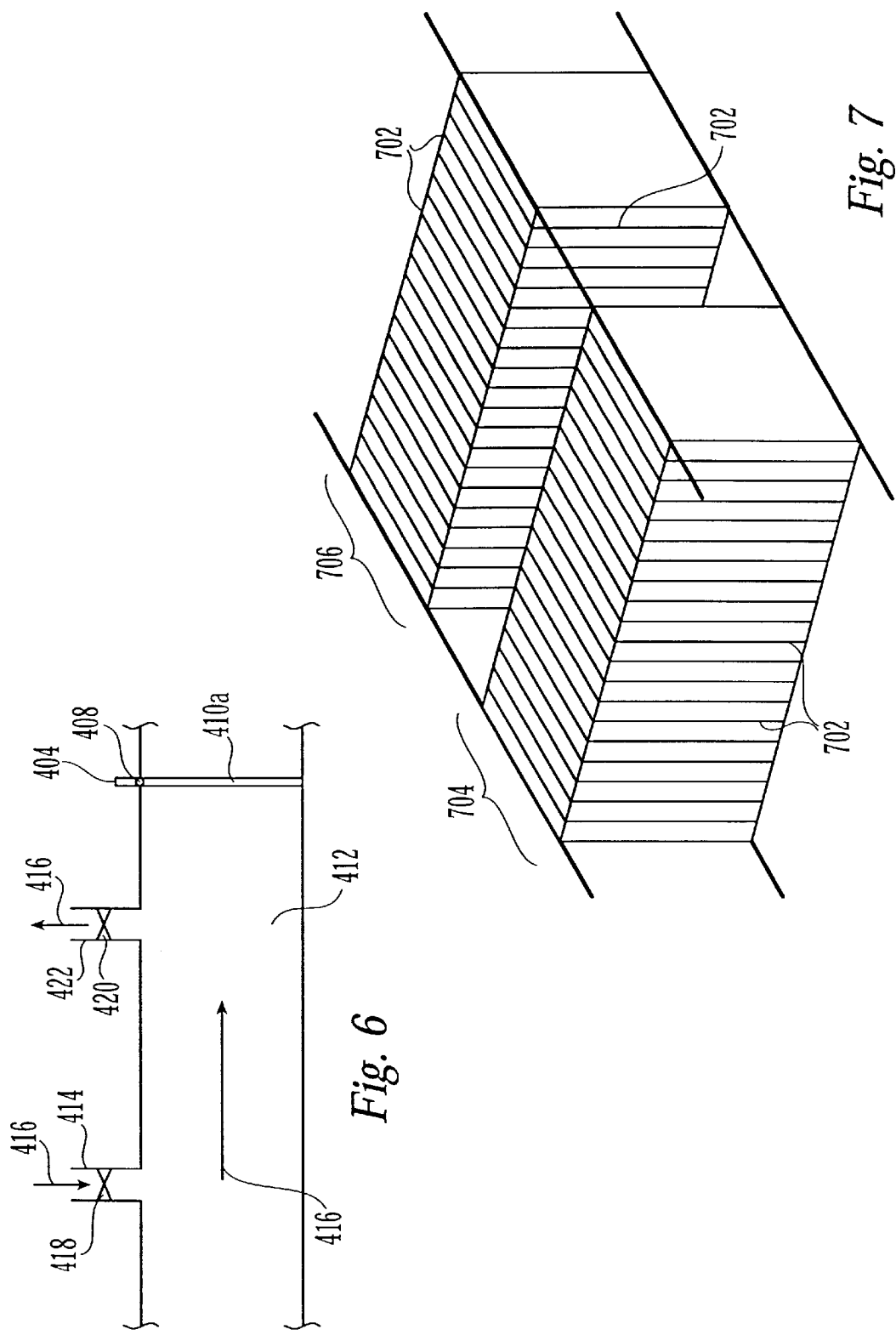

METHOD AND APPARATUS FOR REMOVING VAPOR PHASE CONTAMINANTS FROM A FLUE GAS STREAM

This application claims the benefit of U.S. Provisional Application No. 60/284,588 filed Apr. 16, 2001, which is incorporated herein by reference.

BACKGROUND OF THE INVENTION

1. Field of the Invention

The invention relates generally to the removal of vapor phase contaminants from a gas stream. More specifically, the invention is directed to the removal of vapor phase mercury from the flue gas of a combustion system.

2. Description of Related Art

The emission of trace metals from utility power plants is an important issue in light of the 1990 Clean Air Act Amendment (CAAA), Title III. In particular, special attention has been given to mercury (Hg) in terms of its environmental release and impacts, and the Environmental Protection Agency (EPA) is closely scrutinizing sources that emit mercury. Mercury is present in flue gas from a fossil-fuel-fired combustion system in very low concentrations (<1 ppm) and forms a number of volatile compounds that are difficult to remove. Specially designed and costly emissions-control systems are required to effectively capture these trace amounts of mercury.

Several approaches have previously been adopted for removing mercury from gas streams. These techniques include passing the gas stream through a fixed or fluidized sorbent bed or structure or using a wet scrubbing system. Approaches using fixed bed technologies normally pass the mercury containing gas through a bed consisting of sorbent particles or through various structures such as honeycombs, screens, or fibers that are coated with a sorbent. Common sorbents include activated carbon and noble metals such as gold and silver. In many cases where noble metals are used, the structure is coated with the noble metal sorbent while the support underneath is made of ceramic or metallic materials. The sorbents in these fixed structures can be periodically regenerated by heating the structure and driving off the adsorbed mercury (see, for example, U.S. Pat. Nos. 5,409,522 and 5,419,884, which are incorporated herein by reference). The mercury driven off can then be recovered or removed separately.

However, in regenerating the sorbent in such fixed bed systems, the bed must be taken off-line periodically. This necessitates that a second bed be used and remain online while the first one is regenerating. In addition, the beds need to be located downstream of a primary particulate collection device to remove all of the solid suspended particles in the gas stream and to avoid pluggage. These fixed bed systems also require significant space and are very difficult to retrofit into existing systems, such as into the ductwork of powerplants, without major modifications and high pressure drop penalites (e.g., 10–30 inches of water).

U.S. Pat. Nos. 5,948,143 and 6,136,072, which are incorporated herein by reference, described concepts that addressed some of these problems through the use of porous tubes and plates that can be regenerated and cleaned while in the presence of flue gas containing particles. These porous tubes and plates are cleaned by a series of back pulses across their walls. However, the fabrication of porous tubes and plates is complex and relatively expensive. The tubes and plates are also heavy and difficult to install and heat due to the thick wall requirements.

Therefore, a need remains for a cost-effective method of removing trace contaminants, in particular mercury, from the flue gas of a combustion system. Specifically, there is a need for a fixed bed process for removing such contaminants that can be easily retrofitted into an existing combustion process, easily cleaned to avoid plugging, and easily regenerated.

SUMMARY OF THE INVENTION

The present invention provides a method and apparatus for removing trace contaminants from a gas stream or flue gas. In one embodiment, the present invention an apparatus for removing a trace contaminant from a gas stream, comprising a gas duct configured to receive a gas stream comprising a trace contaminant; a plurality of substrates disposed within the gas duct; a trace contaminant sorbent disposed on at least a portion of each of the substrates; an isolation device for separating the portion of each of the substrates from the gas stream; and a regenerator for regenerating the trace contaminant sorbent.

In another embodiment, the present invention provides a method for removing a trace contaminant from a gas stream, comprising passing a gas stream comprising a trace contaminant through a gas duct; contacting said trace contaminant with a trace contaminant sorbent disposed on at least a portion of a substrate within said gas duct; adsorbing said trace contaminant with said trace contaminant sorbent; isolating said portion of said substrate from said gas stream; cleaning said substrate in-situ and concurrently with said passing of said gas stream through said gas duct; and regenerating said trace contaminant sorbent in-situ and concurrently with said passing of said gas stream through said gas duct.

The present invention provides a cost-effective method of removing trace contaminants, in particular mercury, from the flue gas of a combustion system. Specifically, the present invention provides a fixed bed process for removing such contaminants that can be easily retrofitted into an existing combustion process, easily cleaned to avoid plugging, and easily regenerated.

These and other features of the present invention will appear from the following description from which the preferred embodiments are set forth in detail in conjunction with the accompanying drawings.

BRIEF DESCRIPTION OF THE DRAWINGS

FIG. 6 is a side view of the embodiment of FIGS. 4 and 5;

FIG. 7 is a perspective view of another embodiment according to the present invention.

DETAILED DESCRIPTION OF THE PREFERRED EMBODIMENTS

Figure 1:
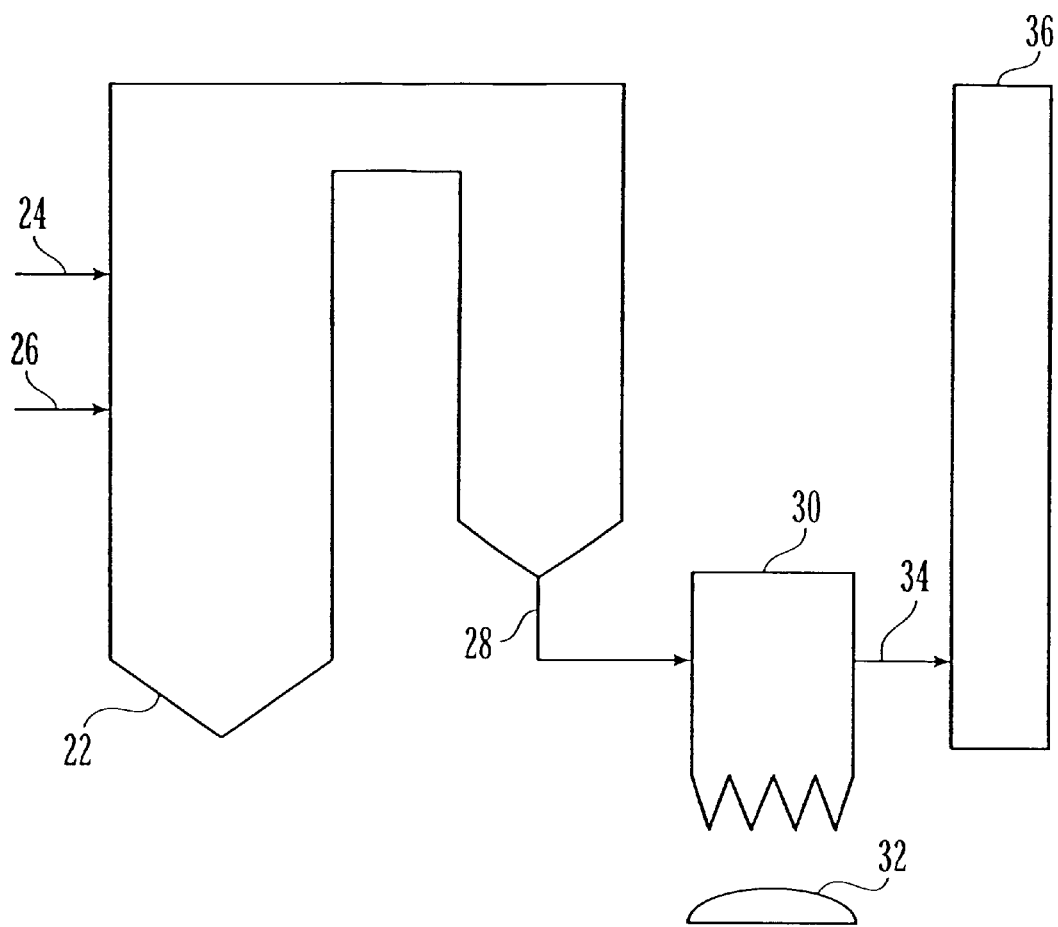
FIG. 1 illustrates one exemplary process in which the present invention may be utilized.

FIG. 1 illustrates one exemplary process in which the present invention may be utilized. A combustion device, such as a fossil-fuel-fired boiler 22, receives air through an air inlet duct 24 to combust fuel, such as coal received through a fuel inlet duct 26. The combustion process within the boiler 22 produces a gas stream in the form of flue gas that exits the boiler 22 through an outlet duct 28. The flue gas produced within the boiler 22 is comprised of air, products of combustion in the gaseous form, such as water vapor, carbon dioxide, oxides of nitrogen and sulfur, halides, organic compounds, mercury, selenium and other trace metal vapors or trace contaminants, and particulate matter. A particulate collection device 30 is connected to the outlet duct 28 and removes particulate matter 32 from the flue gas. The particulate collection device outlet duct 34 directs the flue gas to the stack 36 where it is discharged. It should be appreciated that some systems may not utilize a particulate collection device and that the outlet duct 28 would simply connect with the particulate collection device outlet duct 34.

In accordance with one embodiment of the present invention, a substrate having a trace contaminant sorbent disposed on at least a portion of the surface of the substrate is placed within a gas duct of a process, such as the one described in connection with FIG. 1, that transports flue gas, or through which flue gas passes, wherein the flue gas comprises a trace contaminant that is to be removed or the concentration of which is to be reduced. In a preferred embodiment, the present invention is directed to a plurality of substrates in a gas duct, each having a trace contaminant sorbent disposed on its surface for removal of trace contaminants from a gas stream, such as mercury, wherein relatively high removal of the trace contaminant is achieved at relatively high gas velocities, such as those experienced in an existing gas duct in the process described in accordance with FIG. 1, and at a acceptable pressure drop. It should be appreciated that removal of a trace contaminant is intended to mean at least a reduction in the concentration of the trace contaminant in the flue gas and does not necessarily mean complete removal of all of a particular trace contaminant.

It should be appreciated that, in general, the substrate may be located anywhere in the gas duct of a given process where it is desirable to remove a particular trace contaminant from a flue gas. It should be also appreciated that any number of substrates may be used in either the same general location or in different locations and each of these substrates may have the same, similar, or different shapes and sizes. Moreover, each of these substrates may utilize the same, different, or a mixture of trace contaminant sorbents. The remainder of this description, however, will be presented in the context of the process described in FIG. 1; however, this should not be construed as a limitation on the processes for which the present invention may be used.

Referring back to FIG. 1, the substrate may be placed anywhere in the gas duct, such as at any point along outlet duct 28, particulate collection device outlet duct 34, or the stack 36. One of skill in the art will appreciate the parameters that influence trace contaminant removal, and in particularly, mercury removal, to aid in appropriately selecting the location for the substrate. For example, since lower temperatures (e.g., less than 500° F. and more preferably 150–350° F.) favor mercury adsorption from flue gas streams, the substrate would ideally be located downstream of the airheater in a coal-fired power plant.

The size and shape of the substrate is determined, in part, upon the size and shape of the gas duct into which it is placed. It should be appreciated that the present invention may easily be used as a retrofit in existing processes such as the one described in connection with FIG. 1. In such a retrofit, it would be desirable to utilize existing ductwork for the substrates of the present invention rather than replacing existing ductwork to accommodate a pre-designed substrate or substrates. Therefore, the size and shape of the substrates would be determined based upon the size of the existing ductwork.

The size and shape of the substrate would also be determined, in part, on maximizing contact between the flue gas and the substrate, avoiding or minimizing deposition of particulate and ash in the flue gas on the substrate, and minimizing gas flow pressure drop across the substrate. For example, in connection with the process of FIG. 1 or a similar fossil fuel-fired combustion process, locating the substrate downstream of an existing electrostatic precipitator (ESP) or baghouse will reduce the amount of ash in the gas stream to which the substrate is exposed. Further, locating the substrate downstream of a combination spray dryer-ESP, spray-dryer-baghouse, or wet scrubber will also reduce the amount of acid gas to which the substrate is exposed. All of these considerations will improve the longevity and operation of the substrate and the performance of the trace contaminant sorbent.

As noted, the size and shape of the substrate would be selected to effect the most contact between the gas and the surface of the substrate while minimizing particle deposition and fouling of the plate as well as gas flow resistance or pressure drop. For example, if a plurality of substrates of the present invention were sized to be used in an existing duct that was relatively small, the length of the substrates could be extended to provide the necessary surface area to achieve the desired trace contaminant removal. Preferably, the substrate has a high surface area, such as approximately 1–100 $ft^2$ of surface area per $ft^3$/s of gas flow, more preferably approximately 1–50 $ft^2 ft^3$/s, and most preferably approximately 10 $ft^2/ft^3$/s.

Lastly, it should be appreciated that the substrate may be placed within a gas duct in any orientation. One of skill in the art will appreciate that the orientation of the substrate will be dependent upon many factors, including, for example, the size, shape, and number of substrates, the size and shape of the gas duct itself, the desired contact between the substrate and the flue gas, and the pressure drop across the substrate. One of skill in the art will appreciate how to optimize these and other factors to determine such placement and orientation of the substrate within the gas duct.

In a preferred embodiment, the substrate is a flat, thin plate coated with a trace contaminant sorbent. A typical plate size may be 1–20 feet in length, a height substantially the same as the height of the gas duct into which it is placed, and a thickness of 0.1–1 inch. Such a plate may be made from any appropriate material sufficient to retain a trace contaminant sorbent on its surface and capable of withstanding the flue gas environment into which it is placed. Preferably, such a plate or other substrate may, for example, be made of any metal, including steel, or ceramic.

It should be appreciated that any sorbent may be disposed on the substrate; however, the choice of sorbent will be dependent upon the trace contaminant to be removed, including its physical properties and characteristics. For example, gold is a preferred sorbent for use in the removal of mercury from the flue gas since it readily forms an amalgam with mercury. Other metals that form amalgams with mercury, such as silver and zinc, are also preferred. The sorbent may consist of a single layer of the selected trace contaminant sorbent or of multiple layers of either the same or different sorbents, such as gold plated over silver or zinc. A preferred embodiment comprises gold as the trace contaminant sorbent on a metal substrate or metal or plate. Another preferred embodiment comprises gold as the trace contaminant sorbent coated over layers of silver or zinc coated on a metal substrate. By coating the gold over silver or zinc, less gold is necessary since absorbed mercury will also form an amalgam with the underlying silver or zinc; however, the gold may act to protect the silver or zinc from corrosion. In this embodiment, the gold layer may be on the order of 1 or a few microns in thickness. One of skill in the art will appreciate that the application of the sorbent to the substrate can be performed by various methods known in the art, depending upon the particular sorbent and the particular substrate used, such as electroplating or metal vapor deposition. In a preferred embodiment, the substrate is either a metal or ceramic flat plate, as described above, that is coated with 0.1–100 μm thick layer of trace contaminant sorbent, such as gold or other trace contaminant sorbents, such as silver, zinc, activated carbon, or any other sorbent selected for removal of a specific trace contaminant.

Figure 3:
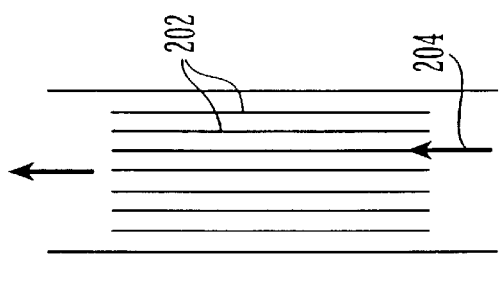
FIG. 3 is a top view of the embodiment of FIG. 2.
Figure 2:
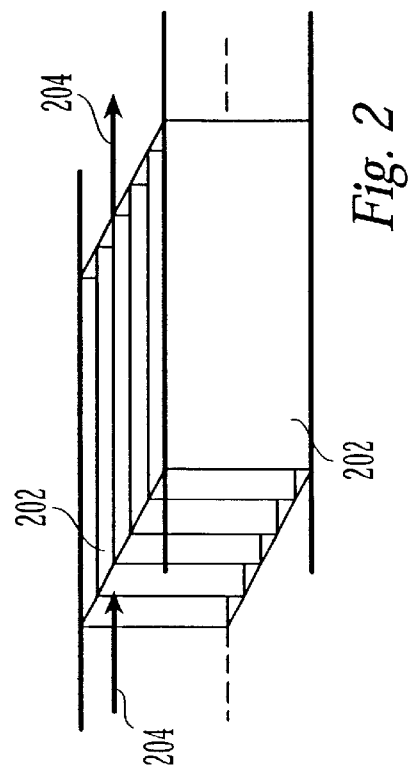
FIG. 2 is a perspective view of one embodiment of the present invention.

FIG. 2 is a perspective view of one embodiment of the present invention and FIG. 3 is a top view of the embodiment of FIG. 2. FIGS. 2 and 3 illustrate a plurality of substrates 202 according to one embodiment of the present invention. In this preferred embodiment the plurality of substrates 202, are preferably flat metal plates that are positioned approximately parallel to the direction of flue gas flow 204 through the gas duct (not shown) and to one another. In this embodiment the pressure drop across the plates is minimized because of the shape of the substrates 202 and their orientation inside of the gas duct with respect to the direction of gas flow 204. As noted above, a preferred size for these metal plates is 1–20 feet long with a height substantially equivalent to the height of the gas duct. A preferred spacing between each of the metal plates is approximately 0.1–20 inches. More specifically, each plate is positioned approximately 0.1–20 inches from an adjacent plate and preferably 0.2–2 inches. It is also preferred to maintain a pressure drop across such a plurality of metal plates of less than 10 inches of water and more preferably less than 5 inches of water at gas velocities of greater than 5 ft/s and more preferably at greater than 20 ft/s. In other words, a preferred embodiment includes a plurality of metal, flat plates oriented substantially parallel to the direction of gas flow through the duct, which may be an existing gas duct in a process such as that described in connection with FIG. 1, wherein the plates are positioned either upstream or downstream of a particulate collection device, the gas velocities are relatively high, such as greater than 5 ft/s and preferably greater than 20 ft/s, but wherein the pressure drop is acceptable, such as less than 10 inches of water and preferably less than 5 inches of water. More preferably, these plates are used for mercury removal and, therefore, utilize gold or activated carbon coated on the plates as the trace contaminant sorbent.

Figure 5:
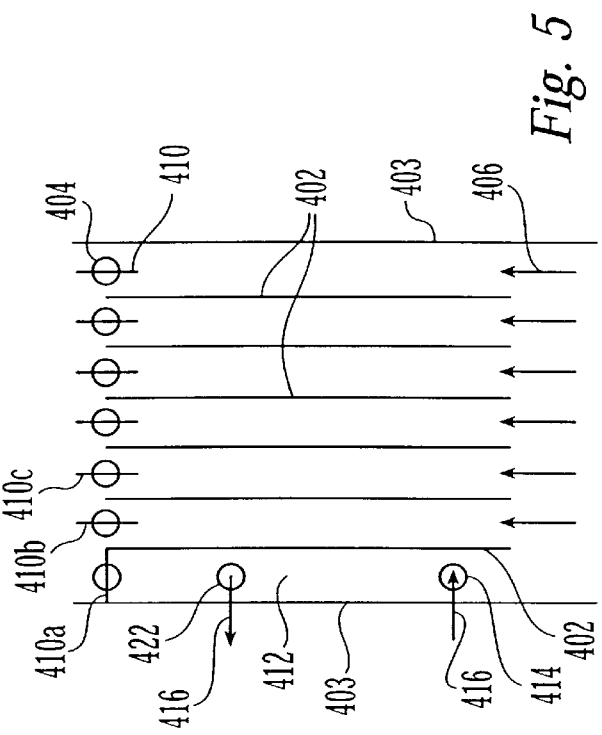
FIG. 5 is a top view of the embodiment of FIG. 4.
Figure 4:
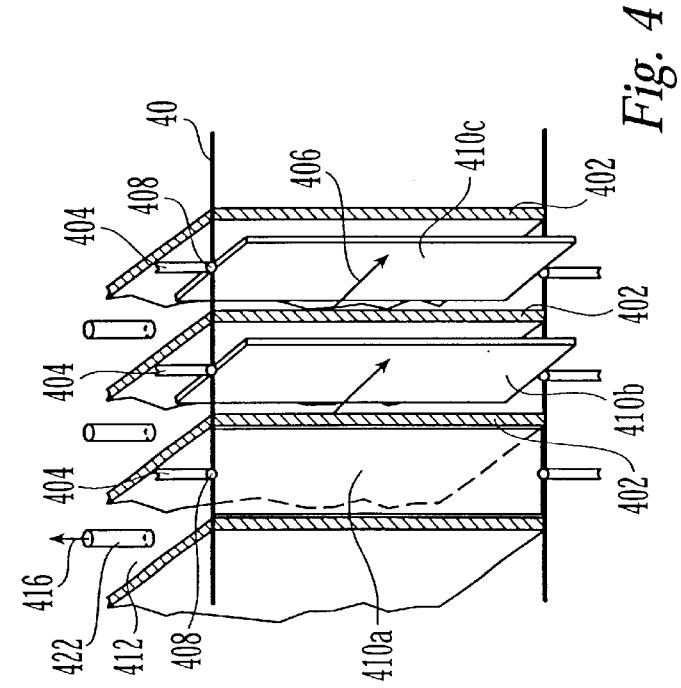
FIG. 4 is a perspective view of another embodiment of the present invention.

FIG. 4 is a perspective view of another embodiment of the present invention, and FIG. 5 is a top view of the embodiment shown in FIG. 4. More specifically, FIG. 4 illustrates a plurality of substrates 402, which in this embodiment are preferably flat metal plates arranged substantially parallel to one another. As noted, FIG. 5 is a top view of these substrates 402 and actually illustrates more substrates 402 than shown in FIG. 4. In this arrangement, the substrates 402 and the gas duct walls 403 essentially form channels through which the gas flow 406 may pass. In this embodiment, however, an isolation device 404 can be used to stop the passage of gas flow 406 through any given channel or past any given side of a substrate 402. As shown in FIG. 4, the isolation device comprises a damper valve 408 and an isolation door 410 that is opened and closed by operation of a corresponding damper valve 408. As shown in FIGS. 4 and 5 one isolation door 410a is shown in the closed position and two isolation doors 410b, 410c are shown in the open position, noting that the additional isolation doors 410 in FIG. 5 are also shown in the open position.

In operation, when the isolation device 404 is in the open position, the isolation door 410 is oriented substantially parallel to the gas flow 406 and thereby allows the gas flow 406 to travel within the corresponding channel. In other words, the gas flow 406 passes between and in contact with two sides of adjacent substrates 402 that form a channel corresponding to the isolation door 410 that is in the open position. More specifically, the gas flow 406 is free to pass between two corresponding sides of two substrates 402, or, in the case where the substrate 402 is located next to the gas duct wall 403, along one corresponding side of a substrate 402 and the gas duct wall 403. When the isolation device 404 is in the closed position, the isolation door 410 prevents the passage of the gas flow 406 through that corresponding channel, thereby isolating one particular side of a substrate 402 and one particular side of an adjacent substrate 402, or, in the case where the substrate 402 is located next to the gas duct wall 403, isolating only that corresponding side of the substrate 402.

This feature is particularly useful for cleaning the substrate or regenerating the trace contaminant sorbent without having to stop the flow of gas through the duct or without having to stop or divert the gas flow through the entire structure of substrates, as will be further described below. In particular, this feature allows the isolated sides of the substrates 402 to be cleaned in-situ, that is without removing them from the gas duct, and the trace contaminant sorbent on those isolated sides can be regenerated in-situ, again without removing the trace contaminant sorbent or substrate from the gas duct. Moreover, this cleaning and regeneration can be performed concurrently with the gas flow 406 moving past the sides of the substrates 402 that have not been isolated.

It should be appreciated, however, that the isolation device 404 and the damper valves 408 may be controlled and activated by any known control system known in the art. Further, more than one isolation device may be activated at the same time or they may be activated in a predetermined, controlled sequence based upon a predetermined set of parameters or measurements. It should also be appreciated, as noted, that one or more isolation devices 404 may be activated and put into the closed position, while the remaining isolation devices 404 remain in the open position, thereby allowing the gas flow 406 to flow concurrently while certain isolation devices 404 are in the closed position and others are in the open position.

It should be appreciated that a cleaning mechanism may be added to clean any type of substrate or substrates used in the present invention. Further, the cleaning mechanism and the method used to clean the substrate or substrates of the present invention may be any cleaning mechanism or method known in the art; however, it should be appreciated that the cleaning mechanism is an optional part of the present invention. For example, a mechanical rapping device or a high pressure air jet may be used to dislodge accumulated particulate matter on the substrate. Furthermore, such cleaning mechanism may be activated and used in conjunction with the operation of the isolation device. That is, upon activating the isolation device, the corresponding side of the substrate that has been isolated may be cleaned using the cleaning mechanism. Moreover, such cleaning may be performed in-situ and concurrent with the flow of flue gas past the other non-isolated substrates.

It should also be appreciated that the present invention may further comprise a regenerator for regenerating the trace contaminant sorbent on the substrate. Such a regenerator may comprise any device capable of desorbing the sorbed trace contaminant from the trace contaminant sorbent. For example, a regenerator may comprise an electrical resistance heater attached to each substrate for heating the substrate to a given temperature at which any trace contaminant is desorbed from the trace contaminant sorbent. Another example of a regenerator is a device capable of providing a hot gas stream that is passed by the substrate and desorbs the trace contaminant from the trace contaminant sorbent based upon the gas stream's temperature. It should be appreciated that the regenerator may be used separately or in combination with the cleaning mechanism. Moreover, such regeneration may be utilized in conjunction with the operation of the isolation device. That is, upon activating the isolation device, the trace contaminant sorbent on the corresponding side of the substrate that has been isolated may be regenerated. Moreover, such regeneration may be performed in-situ and concurrent with the flow of flue gas past the other non-isolated substrates.

As noted, one example of a regenerator comprises a heater for heating the substrate, such as an electrical resistance heating device attached to each substrate. In operation, the substrate would be heated upon activation of the electrical heater to a temperature at which any adsorbed trace contaminant would be desorb from the trace contaminant sorbent. This regeneration could be performed in-situ, that is without removing the substrate from the gas duct. This regeneration could also be performed while the flue gas was not flowing through the gas duct or in conjunction with the isolation device whereby only those isolated substrates, or only those particular isolated sides of certain substrates, are heated to desorb any adsorbed trace contaminant. The desorbed trace contaminant can then be collected by a gas stream that is passed by the isolated sides of those substrates being regenerated. This gas stream can then be routed to a secondary recovery system where the desorbed trace contaminant is collected, concentrated, and disposed of by methods well known in the art. Once the trace contaminant sorbent has been regenerated it is capable of being placed back in service.

FIG. 6 is a side view of the embodiment shown in FIGS. 4 and 5. Specifically, FIG. 6 illustrates one embodiment of a regenerator according to the present invention. Isolation door 410a is shown in the closed position. As such, the corresponding channel has been isolated from the flue gas flow 406. More specifically and with reference to FIGS. 4 and 5, side 402a of one substrate 402 has been isolated (as has the wall of the gas duct 403 adjacent side 402a). With reference to FIG. 6, the inlet regeneration gas duct 414 receives regeneration gas 416, such as hot gas comprising air or steam, from a physically separate regenerator (not shown). Upon isolation of the channel 412 or upon closure of the isolation door 410a, the inlet regeneration gas valve 418 is opened, which permits the inlet regeneration gas 416 to enter this isolated channel 412. In addition, the outlet regeneration gas valve 420 is opened in the outlet regeneration gas duct 422 to permit the regeneration gas 416 to exit the isolated channel 412. The pressure of the regeneration gas 416 within the isolated channel 412 must be high enough to keep the flue gas from entering this isolated channel 412. It should be appreciated, however, that the flue gas itself may also be used as the regeneration gas, in which case, the substrate would simply be heated to desorb the collected trace contaminant. It should also be appreciated that the inlet and outlet regeneration gas valves should be positioned appropriately to avoid or minimize short-circuiting the regeneration gas as it flows through the isolated channel.

As the regeneration gas 416 passes beside and contacts the isolated side 402a of the substrate 402, any adsorbed trace contaminant is desorbed from the trace contaminant sorbent and carried with the regeneration gas 416 through the outlet regeneration gas duct 422. As noted above, after exiting the isolated channel 412, the regeneration gas 416 may be sent to a separate secondary recovery system where the trace contaminant is removed, concentrated, and disposed of by any known method in the art. It should be appreciated that the regenerator and its operation described in connection with FIGS. 4, 5, and 6 would allow the trace contaminant sorbent on each of the substrates to be regenerated in-situ and concurrent with the flue gas flowing through non-isolated channels.

In general operation of the present invention, a trace contaminant would be removed upon contacting the flue gas and, therefore, the trace contaminant, with the trace contaminant sorbent disposed on the substrate, such as a plate. Upon such contact, the trace contaminant would adsorb onto the sorbent. With respect to the removal of mercury, for example, upon contact between the trace contaminant mercury and the trace contaminant sorbent selected to remove mercury, for example, gold, the mercury would be adsorbed on the trace contaminant sorbent on the substrate surface as the flue gas passes over the substrate. In the case of gold, it should be appreciated that the adsorbed mercury reacts with the gold to form an amalgam.

As the substrate surface gets fouled with dust particles from the gas stream, it can be cleaned, preferably in-situ (i.e., without having to remove the substrate from the duct) and during continued operation of the main process (i.e. without stopping the flow of the flue gas, that is, concurrently with the flow of gas through the gas duct). This allows process operation to continue uninterrupted while the substrates or plates, or at least a portion of them, are cleaned. Cleaning may be conducted by mechanically rapping, by directing a high pressure air jet toward the substrate surface to knock the dust or particulate matter off of the surface, or by any other method known in the art. It should be appreciated that such cleaning may be performed at any time or at a particular, predetermined time, for example, at a point where a given amount of particulate matter has attached to the substrate such that contact between the trace contaminant and the trace contaminant sorbent has been significantly adversely affected or reduced.

When the surface of the trace contaminant sorbent becomes saturated with the trace contaminant, the sorbent may be regenerated. In one embodiment, this regeneration may be accomplished by heating the sorbent using electric heaters, steam or the flue gas itself, to desorb the trace contaminant followed by collection of the desorbed contaminant in a secondary recovery system. For example, with respect to removal of mercury, metal plates may be used as the substrate with gold as the trace contaminant sorbent. In this case the plates and the gold sorbent can be regenerated by heating the plates so that the mercury desorbs since the formation of an amalgam is a relatively easily reversible reaction. It should further be appreciated that mercury can be easily desorbed from activated carbon upon heating as well. Any mercury desorbed from the plates can be recovered in a secondary system for later containment through condensation or other storage mechanism or process.

In a preferred embodiment, such regeneration may be conducted in-situ and concurrent with the flow of flue gas through the gas duct. For example, the regeneration can take place within the gas stream by isolating some or all of the substrates via the use of an isolation device, such as a system of damper valves as described in connection with FIGS. 4 and 5.

FIG. 7 is a perspective view of another embodiment according to the present invention. While embodiments described above relate to the ability to clean the substrate and regenerate the trace contaminant sorbent in-situ and concurrent with the flow of flue gas through non-isolated sections, FIG. 7 shows an alternative approach. In this embodiment, the substrates 702 are preferably flat, thin, metal plates arranged substantially parallel to one another. However, in this embodiment, there are two sets or cartridges of these substrates 704, 706. In this configuration, one set or cartridge of substrates may be removed from the system for cleaning and regeneration while the other set is in use. As such, the process flue gas need only be shut down to permit removal of one of the sets of substrates 704, 706, or alternatively, a gas bypass arrangement may be made such that the process flue gas does not need to be shut down at all. Once removed, one set of substrates could be easily cleaned and regenerated by any method known in the art. In this embodiment, it is important to design the substrates such that one set alone will provide the required removal of a given trace contaminant. It should be appreciated that more than two sets of substrates may be used such that several smaller sets of substrates are used thereby facilitating easier removal, cleaning, regeneration, and replacement.

The invention having been described, the following Example is presented to illustrate, rather than to limit the scope of the invention.

EXAMPLE 1

Figure 8:
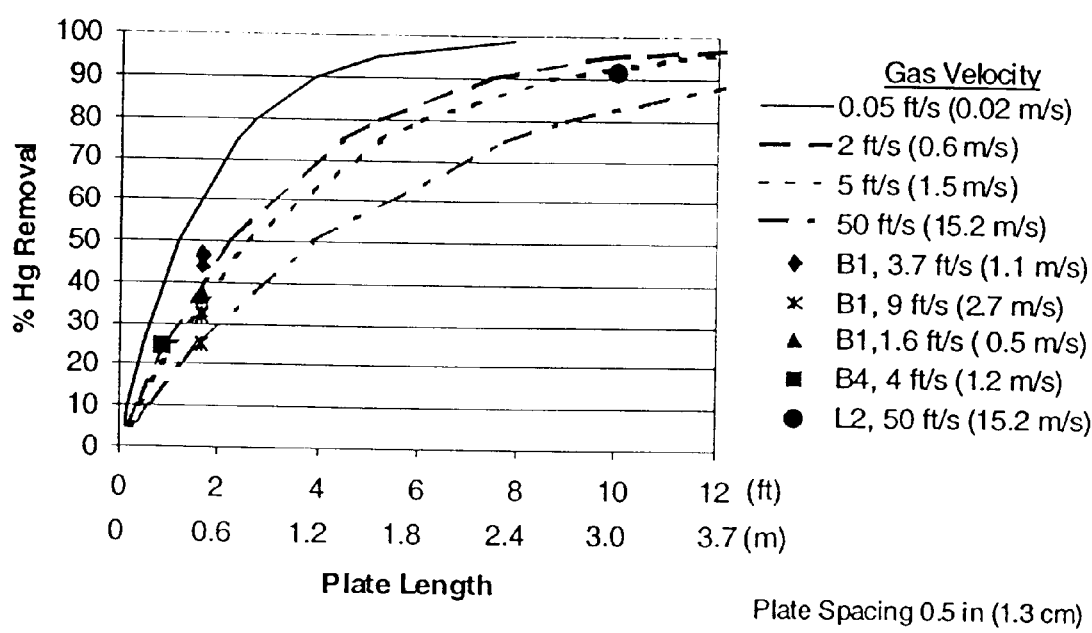
FIG. 8 illustrates test results according to one embodiment of the present invention.

Tests have been conducted in the laboratory and at 7 power plants burning lignite, PRB, and bituminous coals to determine real-time mercury removal across gold-coated plates and mercury removal following several weeks of exposure to flue gas at each plant. Tests were conducted downstream of ESPs, scrubbers, spray dryers, and baghouses. FIG. 8 presents the results from these tests as a function of the plate length, where the plates were spaced approximately 0.5 inches apart. In one test, 90% mercury removal was achieved using plates having a length of 10 ft that were spaced approximately 0.5 inches apart at a flue gas velocity of 50 ft/s and a resulting pressure drop of less than 3 inches of water.

Various embodiments of the invention have been described above. The descriptions are intended to be illustrative of the present invention and are not intended to be limiting. It will be apparent to one of skill in the art that modifications may be made to the invention as described without departing from the scope of the claims set out below. For example, it is to be understood that although the invention has been described using as an example mercury, any trace contaminant may be removed by the present invention. It should be also be appreciated that the present invention is adaptable to existing flue gas ducts or for use in new gas ductwork. Furthermore, it is to be understood that although the invention has been described for use in connection with flue gas streams from combustion processes, is contemplated that the invention may be used in connection with any gas stream containing a trace contaminant.

What is claimed is:

1. An apparatus for removing a trace contaminant from a gas stream, comprising:
    a gas duct configured to receive a gas stream comprising a trace contaminant;
    a plurality of substrates fixedly disposed within said gas duct;
    a layer of a trace contaminant sorbent disposed on at least a surface portion of each of said substrates;
    an isolation device for separating said portion of each of said substrates from the gas stream; and
    a regenerator for regenerating said trace contaminant sorbent.

2. The apparatus of claim 1, wherein said plurality of substrates comprises a plurality of metal plates.

3. The apparatus of claim 2, wherein each of said metal plates is oriented substantially parallel to a direction of flow of said gas stream and wherein each of said metal plates is positioned approximately 0.1–20 inches from an adjacent metal plate.

4. The apparatus of claim 2, wherein said trace contaminant sorbent comprises gold.

5. The apparatus of claim 1, wherein said regenerator comprises a heater capable of heating said plurality of metal plates in-situ and concurrently as the gas stream passes through said gas duct.

6. The apparatus of claim 1, wherein said regenerator is capable of providing a regeneration gas stream.

7. The apparatus of claim 1, further comprising a cleaning mechanism for cleaning said plurality of substrates in-situ and concurrently as the gas stream passes through said gas duct.

8. The apparatus of claim 7, wherein said cleaning mechanism comprises a mechanical rapper attached to said plurality of substrates.

9. The apparatus of claim 7, wherein said cleaning mechanism comprises a air jet capable of directing a cleaning gas stream toward said plurality of substrates.

10. An apparatus for removing a trace contaminant from a gas stream, comprising:
    a gas duct configured to receive a flue gas stream comprising a trace contaminant;
    a plurality of metal plates disposed within said gas duct, wherein each of said metal plates is positioned substantially parallel to one another;
    a trace contaminant sorbent disposed on at least a portion of each of said metal plates;
    an isolation device for separating said portion of each of said metal plates from the flue gas stream;
    a cleaning mechanism for cleaning each of said metal plates in-situ and concurrently as the flue gas stream passes through said gas duct; and
    a regenerator for regenerating said trace contaminant sorbent.

11. The apparatus of claim 10, wherein said regenerator comprises a heater capable of heating said plurality of metal plates in-situ and concurrently as the gas stream passes through said gas duct.

12. The apparatus of claim 10, wherein said regenerator is capable of providing a regeneration gas stream.

13. The apparatus of claim 10, wherein said trace contaminant sorbent comprises gold.

14. A method for removing a trace contaminant from a gas stream, comprising:
    passing a gas stream comprising a trace contaminant through a gas duct;

contacting said trace contaminant with a trace contaminant sorbent disposed on at least a portion of a substrate within said gas duct;

adsorbing said trace contaminant with said trace contaminant sorbent;

isolating said portion of said substrate from said gas stream;

cleaning said substrate in-situ and concurrently with said passing of said gas stream through said gas duct; and regenerating said trace contaminant sorbent in-situ and concurrently with said passing of said gas stream through said gas duct.

15. The method of claim 14, wherein said trace contaminant comprises mercury and said trace contaminant sorbent comprises gold.

16. The method of claim 14, wherein said cleaning comprises mechanically rapping said substrate.

17. The method of claim 14, wherein said cleaning comprises directing a stream of cleaning gas toward said substrate.

18. The method of claim 14, wherein said regenerating comprises heating said trace contaminant sorbent in-situ.

19. An apparatus for removing a trace contaminant from a gas stream, comprising:

a gas duct configured to receive a gas stream comprising a trace contaminant;

a plurality of substrates disposed within said gas duct;

a trace contaminant sorbent disposed on at least a portion of each of said substrates;

an isolation device for separating said portion of each of said substrates from the gas stream;

a cleaning mechanism for cleaning said plurality of substrates in-situ and concurrently as the gas stream passes through said gas duct; and a regenerator for regenerating said trace contaminant sorbent.

20. The apparatus of claim 19, wherein said cleaning mechanism comprises a mechanical rapper attached to said plurality of substrates.

21. The apparatus of claim 19, wherein said cleaning mechanism comprises a air jet capable of directing a cleaning gas stream toward said plurality of substrates.

\* \* \* \* \*